(12) United States Patent
Pathare (10) Patent No.: US 6,842,677 B2
(45) Date of Patent: Jan. 11, 2005

(54) VEHICLE USER INTERFACE SYSTEM AND METHOD

(76) Inventor: Prakash S. Pathare, 175 Maxwell Rd., Latham, NY (US) 12110

( * ) Notice: Subject to any disclaimer, the term of this patent is extended or adjusted under 35 U.S.C. 154(b) by 0 days.

(21) Appl. No.: 10/376,783

(22) Filed: Feb. 28, 2003

(65) Prior Publication Data

US 2004/0172182 A1 Sep. 2, 2004

(51) Int. Cl.⁷ .............................................. G06F 7/00
(52) U.S. Cl. ............................. 701/36; 701/33; 701/41; 340/995.27
(58) Field of Search ................................ 701/1, 33, 36, 701/41, 211; 340/995.16, 995.17, 995.27

(56) References Cited

U.S. PATENT DOCUMENTS

| | | | |
|---|---|---|---|
| 5,006,829 A | 4/1991 | Miyamoto et al. | 340/459 |
| 5,121,099 A | 6/1992 | Hegg et al. | 340/461 |
| 5,757,268 A | 5/1998 | Toffolo et al. | 340/461 |
| 5,821,935 A | 10/1998 | Hartman et al. | 345/839 |
| 5,847,704 A | 12/1998 | Hartman | 345/764 |
| 6,009,355 A | 12/1999 | Obradovich et al. | 701/1 |
| 6,223,103 B1 | 4/2001 | Patil | 359/819 |
| 6,240,347 B1 | 5/2001 | Everhart et al. | 701/36 |
| 6,300,939 B1 | 10/2001 | Decker et al. | 345/157 |
| 6,401,029 B1 * | 6/2002 | Kubota et al. | 701/201 |
| 6,437,689 B2 * | 8/2002 | Kawai et al. | 340/439 |
| 6,520,699 B2 * | 2/2003 | Abe | 400/485 |

* cited by examiner

Primary Examiner—Gertrude A. Jeanglaude
(74) Attorney, Agent, or Firm—John W. LaBatt; Hoffman, Warnick & D'Alessandro LLC (57) ABSTRACT

The invention provides a user interface for a vehicle. A display is configured to include a fixed area and a selectable area. The fixed area displays vehicle information, while the selectable area displays one of a plurality of pages that includes parameters for at least one of a plurality of optional subsystems for the vehicle. A steering device for the vehicle can include a first and second set of input devices mounted on opposing sides of the steering device. The first set of input devices select one of the plurality of pages to display in the selectable area. The second set of input devices adjust parameters on the selected page.

21 Claims, 5 Drawing Sheets

| DISPLAY BRIGHTNESS | AUDIO | AIR COND HEATING | PASSENGER SEAT ADJ | NAVIGATION |
|---|---|---|---|---|

| LIGHTS PASSENGER | | CELLULAR PHONE |
|---|---|---|
| | ☐ AUDIO SYSTEM<br>☐ CASSETTE<br>☐ Play ☐ Back volume<br>☐ FF ☐ Right speaker<br>☐ Rewind ☐ Left speaker<br>☐ Stop ☐ Bass<br>☐ Eject ☐ Treble<br>☐ Front volume ☐ Dolby<br>☐ Equaliser | |

VEHICLE USER INTERFACE SYSTEM AND METHOD

BACKGROUND OF THE INVENTION

1. Technical Field

The invention relates to vehicle user interfaces. In particular, the invention provides vehicle user interface systems and methods that allow a driver to view and control a plurality of subsystems using a display having a fixed area and a selectable area and/or input devices located on a steering device for the vehicle.

2. Background Art

In recent years, an increasing number of features have been included in vehicles. As more features are included, the efficient display of information and operation of the various features becomes an increasingly difficult problem. Generally, each feature should be operable by the driver of the vehicle since he/she is often the only individual in the vehicle. However, a driver's primary concern is the operation of the vehicle on a road. Consequently, it is desirable that a user interface for operating the various features require a minimal amount of distraction for the driver. Further, as the number of features increases, the amount of space available to display information and place input devices has remained substantially the same. As a result, the interior of the vehicle has become increasingly cluttered with various input/output devices for the numerous features. Consequently, it is desirable to reduce the space allocated for displaying information and operating the features.

Previous solutions to the space/user interface problem have suggested altering the size and/or location of the displayed information. Some solutions have included input devices hanging from the roof, mounted on the interior of doors, on a center panel, on the dashboard, and/or on the steering wheel. These solutions generally require that certain functions be performed by using one or more input devices located away from the steering wheel of the vehicle. Further, by changing the location and/or size of the information displayed, these solutions require additional visual searching by a driver to locate the desired information in the vehicle. Thus, in each of the previous solutions, the driver must remove a hand from the steering wheel and/or divert focus from the road in order to perform one or more the operations.

As a result, there exists a need for user interface methods and systems that allow a driver to operate the various features while maintaining both hands on the steering device. Further, there exists a need for a user interface that allows a driver to easily locate desired information to reduce the time that his/her focus is away from the road. Still further, there exists a need to maintain an aesthetically pleasing vehicle interior while providing various features.

SUMMARY OF THE INVENTION

The invention provides user interface systems and methods for a vehicle. A display is provided to a driver that includes a fixed area and a selectable area. The fixed area displays vehicle information such as speed, gas level, mileage, etc. The selectable area displays a page that includes parameters for one or more optional subsystems. The desired page can be selected by the driver using a first set of input devices mounted on a side of the steering device (i.e., steering wheel) of the vehicle. Parameters displayed on the selected page can be selected and adjusted using a second set of input devices mounted on an opposing side of the steering device. A second display and/or a third set of input devices can also be provided to allow a passenger in the vehicle to view and/or select one of the pages and adjust one or more of the displayed parameters.

A first aspect of the invention provides a user interface system for a vehicle having a steering device, the system comprising: a plurality of pages, wherein each page includes at least one parameter for at least one of a plurality of optional subsystems for the vehicle; a display mounted behind the steering device, the display including a fixed area and a selectable area, wherein the fixed area displays vehicle information and the selectable area displays one of the plurality of pages; and a computing system in communication with the display device, wherein the computing system operates each of the plurality of optional subsystems based on the at least one parameter.

A second aspect of the invention provides a user interface system for a vehicle having a steering device, the system comprising: a plurality of pages, wherein each page includes at least one parameter for at least one of a plurality of optional subsystems for the vehicle; a display including a fixed area and a selectable area, wherein the fixed area displays vehicle information and the selectable area displays one of the plurality of pages; a first set of input devices that select one of the plurality of pages to display in the selectable area; and a second set of input devices that adjust the at least one parameter on the selected page; wherein the first set of input devices and the second set of input devices are mounted on opposing sides of the steering device.

A third aspect of the invention provides a method of operating a plurality of optional subsystems for a vehicle having a steering device, the method comprising: displaying vehicle information in a fixed area of a display; displaying one of a plurality of pages in a selectable area of the display, wherein each page includes at least one parameter for at least one of the plurality of optional subsystems; selecting a page to display in the selectable area using a first set of input devices mounted on a first side of the steering device; and adjusting the at least one parameter on the selected page using a second set of input devices mounted on a second side of the steering device.

The illustrative aspects of the invention are designed to solve the problems herein described and other problems not discussed, which are discoverable by a skilled artisan.

BRIEF DESCRIPTION OF THE DRAWINGS

These and other features of this invention will be more readily understood from the following detailed description of the various embodiments of the invention taken in conjunction with the accompanying drawings in which.

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE INVENTION

The invention provides user interface systems and methods for a vehicle. A display is provided to a driver that includes a fixed area and a selectable area. The fixed area displays vehicle information such as speed, gas level, mileage, etc. The selectable area displays a page that includes parameters for one or more "optional" subsystems. An optional subsystem is a subsystem that is optionally included with a vehicle (i.e., cruise control, navigation, etc.) and/or is optionally configured and operated (i.e., radio, seat adjustment, etc.) using a computer system installed in the vehicle. One or more pages can be used to configure each optional subsystem. The desired page can be selected by the driver using a first set of input devices mounted on a side of the steering device (i.e., steering wheel) of the vehicle. Parameters displayed on the selected page can be selected and adjusted using a second set of input devices mounted on an opposing side of the steering device. A second display and/or a third set of input devices can also be provided to allow a passenger in the vehicle to view and/or select one of the pages and adjust one or more of the displayed parameters.

Figure 1:
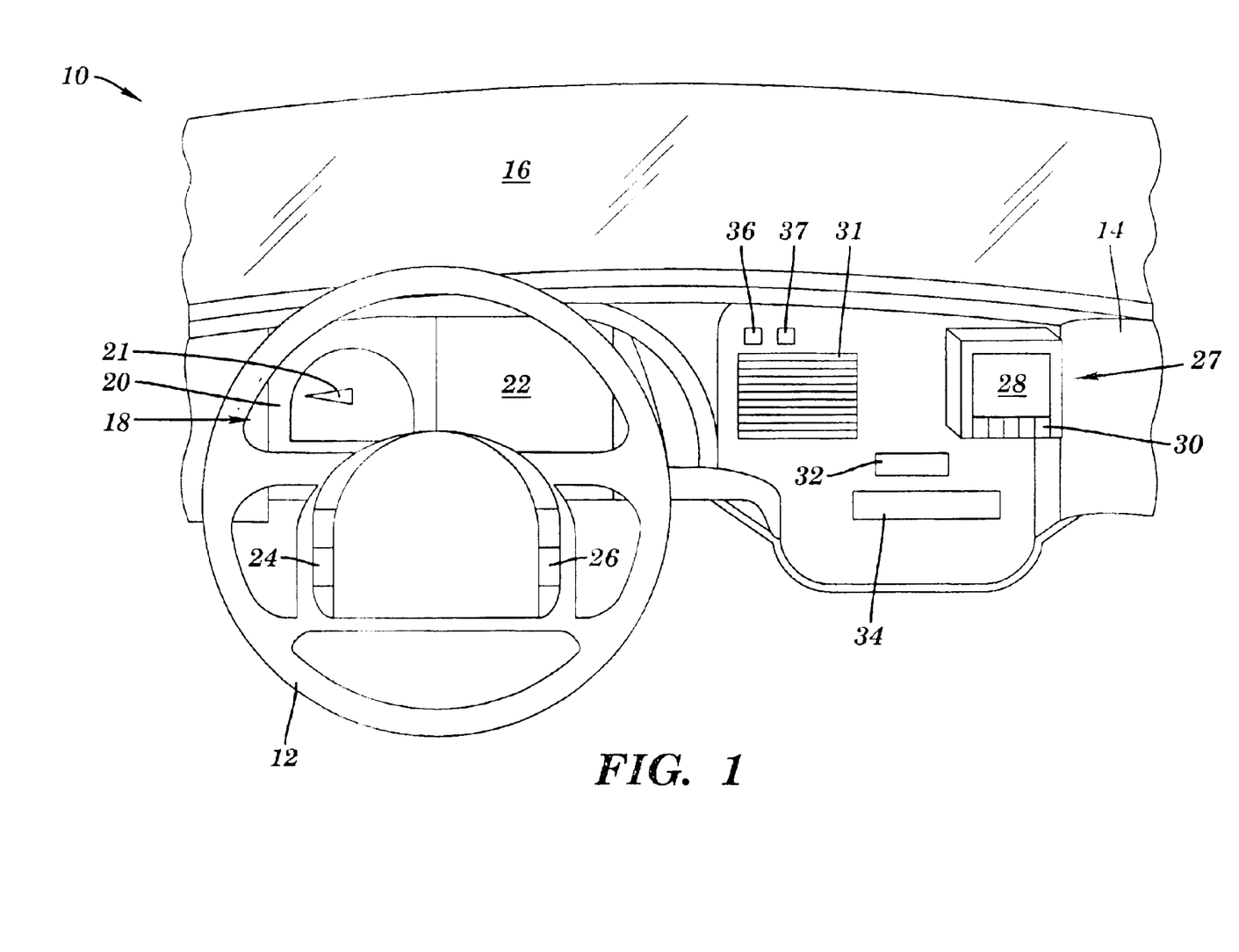
FIG. 1 depicts an illustrative portion of an interior of a vehicle according to one embodiment of the invention.

Turning to the figures, FIG. 1 depicts an illustrative portion of the interior of a vehicle 10 according to one embodiment of the invention. Vehicle 10 includes a steering device 12, a dashboard 14, and a windshield 16. The invention provides a user interface system that includes a display 18 having a fixed area 20 and a selectable area 22. Fixed area 20 displays vehicle information, while selectable area 22 displays one of a plurality of pages that include at least one parameter for one or more optional subsystems installed in vehicle 10. Display 18 is mounted in dashboard 14 behind steering device 12. As a result, when a driver of vehicle 10 sits to operate vehicle 10, display 18 can easily be viewed by the driver by looking directly in front of steering device 12 and slightly below windshield 16. However, it is understood that selectable area 22 can be located anywhere in vehicle 10 so that it can be more easily viewed by the driver as well as other occupants of vehicle 10. Alternatively, vehicle 10 can include a secondary interface 27 that includes a second display 28 that displays one of the plurality of pages. Secondary interface 27 can be mounted to dashboard 14 in a manner that allows one or more passengers of vehicle 10 to easily view second display 28 and/or operate set of input devices 30.

Display 18 can comprise any combination of means for displaying information now known or later developed. For example, the current speed of the vehicle can be displayed in fixed area 20 by speedometer 21. Speedometer 21 can comprise a mechanical dial, a computer generated dial, a computer generated numeric value, etc. Similarly, indicators of other information can be computer or mechanically generated. In one embodiment, fixed area 20 displays vehicle information that is predetermined when display 18 is installed in vehicle 10. Alternatively, some or all of the vehicle information displayed in fixed area 20 can be selectively modified, for example, based on a driver identification. However, the information displayed in fixed area 20 preferably cannot be modified while the vehicle is being driven. Selectable area 22 and second display 28 comprise any type of computer-aided display now known or later developed. For example, selectable area 22 and second display 28 can comprise a black and white or color liquid-crystal display (LCD).

As noted above, fixed area 20 displays vehicle information for use by the driver. Vehicle information comprises various information that is always displayed to the driver of the vehicle. For example, vehicle information typically includes the current speed of the vehicle, the current mileage of the vehicle, a temperature indicator for the engine, and an amount of gas remaining for the vehicle. Other vehicle information can also be included, such as the revolutions per minute (RPMs) for the engine, a voltage level for the battery, an oil pressure, a currently selected gear for the vehicle, a trip distance, fuel efficiency, etc. Other information can also be included in fixed area 20 such as an interior/exterior temperature, a direction the vehicle is facing, a time, a maintenance indicator, etc.

Selectable area 22 displays one of a plurality of pages of information that are used to adjust parameters for the optional subsystems installed in vehicle 10. Each page is configured to include one or more parameters for one or more optional subsystems installed in vehicle 10. For example, a page may include various parameters for operating an audio system for vehicle 10, and a second page may include various parameters for obtaining directions for a trip. A user can select one of the pages to be displayed in selectable area 22 using a first set of input devices 24. For the displayed page, the user can further select one or more of the parameters and adjust the setting for the selected parameter or perform an operation using the appropriate subsystem using a second set of input devices 26.

In the current embodiment, the user interface system for vehicle 10 allows all control for optional subsystems to be performed by using sets of input devices 24, 26 and/or 30. Because of this, no switches, buttons, dials, etc. are required on dashboard 14 or the remaining interior of vehicle 10. As a result, the interior of vehicle 10 can have a simplified, more spacious look. However, several devices for the various optional subsystems may be included on dashboard 14. For example, a vent 31 can be included for the heating/cooling subsystem. Further, a device 32 for accepting an audio tape, and/or a device 34 for accepting a CD/DVD can be included for an entertainment subsystem. Still further, a microphone 36 and/or speaker 37 can be included for use by one or more of the optional subsystems. Speaker 37 can also be used to generate an audible sound (i.e., unique tone, name of page, etc.) when a new page is selected in selectable area 22 to inform the driver of the currently selected page.

Figure 2:
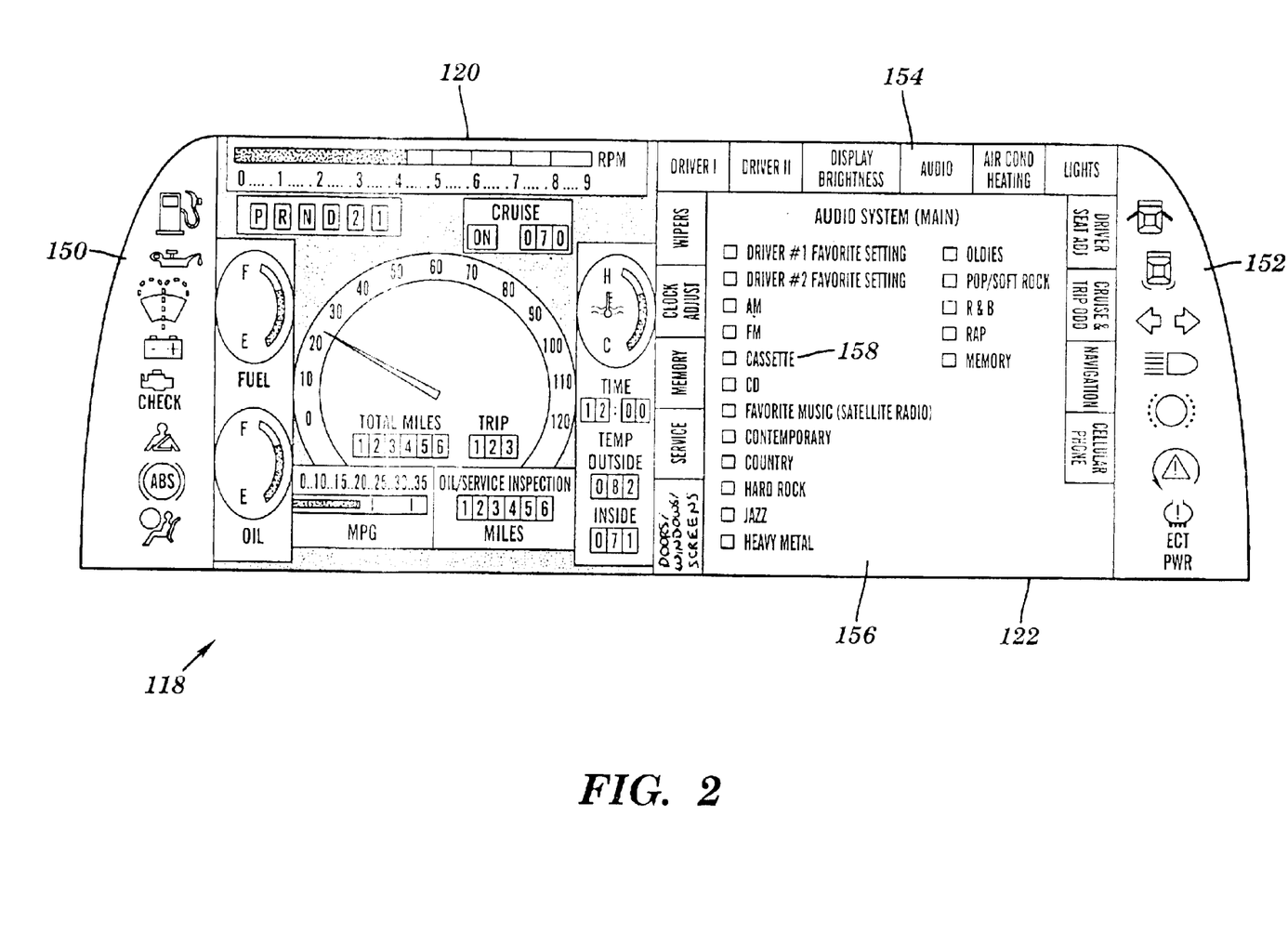
FIG. 2 depicts an illustrative display according to another embodiment of the invention.

FIG. 2 depicts an illustrative display 118 according to one embodiment of the invention. Display 118 includes a fixed area 120, a selectable area 122, and two warning areas 150, 152. Fixed area 120 displays vehicle information and selectable area 122 displays a page of parameters as discussed above. Warning areas 150, 152 display one or more vehicle warning indicators. Any combination of means now known or later developed for displaying warning indicators can be used. For example, each indicator can comprise a predetermined area within one of warning areas 150, 152 that includes a symbol representing a warning condition. When a warning condition is detected (i.e., low voltage from the battery), the corresponding area is illuminated to indicate the presence of the warning condition. While shown displayed in warning areas 150, 152, it is understood that the various warning conditions could be displayed within fixed area 120 and/or selectable area 122.

One or more areas within selectable area 122 can be reserved to display identifiers 154 for some or all of the pages that can be displayed in selectable area 122. The identifier that represents the page currently being displayed can be highlighted (i.e., a unique color, bold, designated location, reverse colors, etc.). As shown, an identifier 154 for a page in each subsystem is always displayed, and are located along the top and sides of selectable area 122. It is understood, however, that identifiers 154 can be located along only the top, only the bottom, etc., and that the identifiers 154 displayed can scroll so that a particular identifier 154 is not always displayed in selectable area 122. Alternatively, an audio signal can be generated each time a page is selected in conjunction with or alternatively to displaying and highlighting identifiers 154.

Initially, when a vehicle is first turned on, selectable area 122 can display only identifiers 154. Alternatively, a default page (i.e., the last page displayed, a welcome page, a commonly accessed page, etc.) can be selected and displayed in selectable area 122. For example, page 156 is shown for operating and configuring an audio subsystem. Page 156 includes various parameters (i.e., AM, FM, Cassette, CD, etc.) for operating features of the audio subsystem. A user can use one or more sets of input devices (i.e., sets of input devices 24, 26, 30 shown in FIG. 1) to adjust the parameters and operate the radio subsystem. When a parameter is selected, one or more input devices can be used to adjust the parameter. Alternatively, selecting a parameter can present the user with a new page 156 that includes various additional parameters. For example, a user can select the cassette parameter 158 and page 156 would change to the page that contains the various parameters for operating a cassette player (shown displayed in secondary display 128 in FIG. 4). Alternatively, an identifier 154 for the cassette player could be included along with, and accessed in a manner similar to identifiers 154.

Returning to FIG. 1, steering device 12 includes first set of input devices 24 and second set of input devices 26. First set of input devices 24 are mounted on a left side of steering device 12, while second set of input devices 26 are mounted on a right side of steering device 12. When operating vehicle 10, a driver can hold onto steering device 12 with two hands. This allows first set of input devices 24 to be readily operated with the left hand of the driver, and second set of input devices 26 to be readily operated with the right hand of the driver. It is understood however, that sets of input devices 24, 26 can be operated in any manner desired by the driver.

Sets of input devices 24, 26 allow a driver of vehicle 10 to select one of the plurality of pages to display in selectable area 22, and to select and adjust parameters on the selected page. In one embodiment, first set of input devices 24 are operated to select one of the plurality of pages to display in selectable area 22. Once the desired page is displayed, second set of input devices 26 are operated to select and adjust parameters on the selected page. For example, as shown in FIG. 2, first set of input devices 24 can be operated to change the selected identifier 154, while second set of input devices 26 can be operated to change the selected parameter 158. Sets of input devices 24, 26 can also be used to operate second display 28. However, second display 28 preferably includes a third set of input devices 30 mounted thereto that operate second display 28 independently from display 18.

Figure 3:
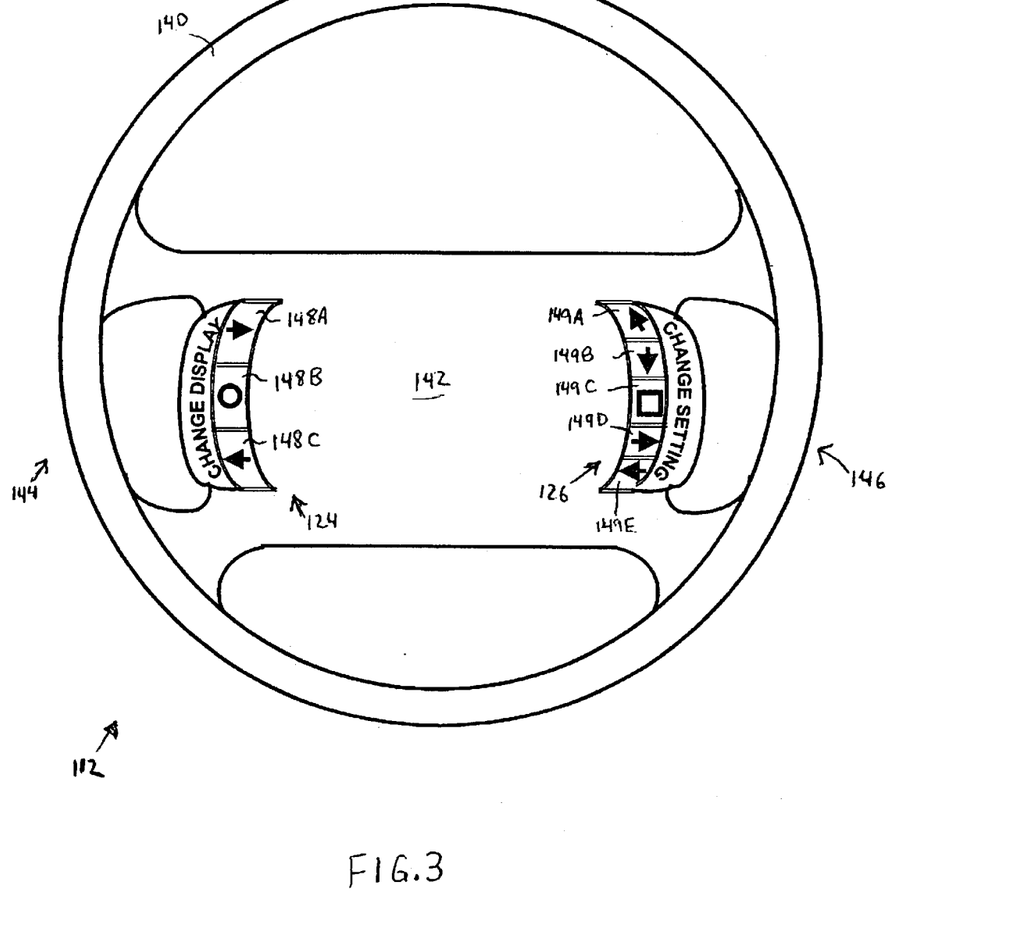
FIG. 3 depicts an illustrative steering device according to yet another embodiment of the invention.

FIG. 3 depicts an illustrative steering device 112 according to another embodiment of the invention. Steering device 112 includes a circular exterior 140 and a central area 142. Central area 142 is attached to exterior 140 in a manner that allows a driver to grip exterior 140 in various locations, including locations 144, 146. A first set of input devices 124 is mounted to central area 142 in an area proximate location 144 of exterior 140. A second set of input devices 126 is similarly mounted to central area 142 in an area proximate location 146 on the opposing side of central area 142. It is understood that sets of input devices 124, 126 can be mounted to steering device 140 using any means now known or later developed. Further, it is understood that each set of input devices 124, 126 can include one or more input devices of the same or varying types. For example, an input device in set of input devices 124, 126 can comprise a switch, a rotation device, a push button, a joystick, etc.

In the current embodiment, first set of input devices 124 is used to select one of the plurality of pages to display in selectable area 22 of display 18 (FIG. 1). First set of input devices 124 can be used to move forward and/or backward one page at a time through the plurality of pages. For example, first set of input devices 124 can comprise three input devices 148A–C. Input device 148A is used to move a selected page forward one page and input device 148C is used to move the selected page backward one page. Input device 148B is used to lock in the selected page, and change the currently displayed page to the selected page. Using first set of input devices 124, the driver can cycle through the pages (using a visual and/or audio indication of the currently selected page), and change the displayed page when the desired page is selected. Alternatively, first set of input devices 124 can comprise two input devices that are used to move forward and backward through the plurality of pages until the desired page is displayed. In yet another embodiment, first set of input devices 124 can comprise a single input device that is used to move forward and/or backward through the plurality of pages. In the latter two embodiments, the displayed page can be changed to the selected page each time an input device is used to change the currently selected page.

Second set of input devices 126 adjust one or more parameters included on the displayed page. In the current embodiment, second set of input devices 126 includes five input devices 149A–E. Input devices 149A, 149B can be used to change a currently selected parameter in the displayed page. Similar to the identifiers discussed above, the selected parameter can be highlighted on the page. Once the desired parameter is selected, input devices 149D, 149E can be used to adjust the selected parameter higher/lower, faster/slower, up/down, etc. Input device 149C can be used to lock in the adjusted parameter for the operation of the corresponding optional subsystem. Alternatively, input devices 149A, 149B can be used to select and adjust parameters. In this case, input device 149C can be used to change the function of input devices 149A, 149B between selecting a parameter and adjusting the selected parameter, and input devices 149D, 149E would not be required.

Each input device 148A–C, 149A–E can include a symbol, word, unique shape, and/or raised symbol that identifies the function provided by the input device 148A–C, 149A–E. While shown on opposing sides (left, right) of central area 142, it is understood that sets of input devices 124, 126 can be mounted in any location on steering device 112. Further, while set of input devices 124 is generally discussed as selecting a page, and set of input devices 126 is generally discussed as selecting and adjusting parameters, it is understood that the invention is not limited to this configuration, and sets of input devices 124, 126 can perform any combination of functions.

Figure 4:
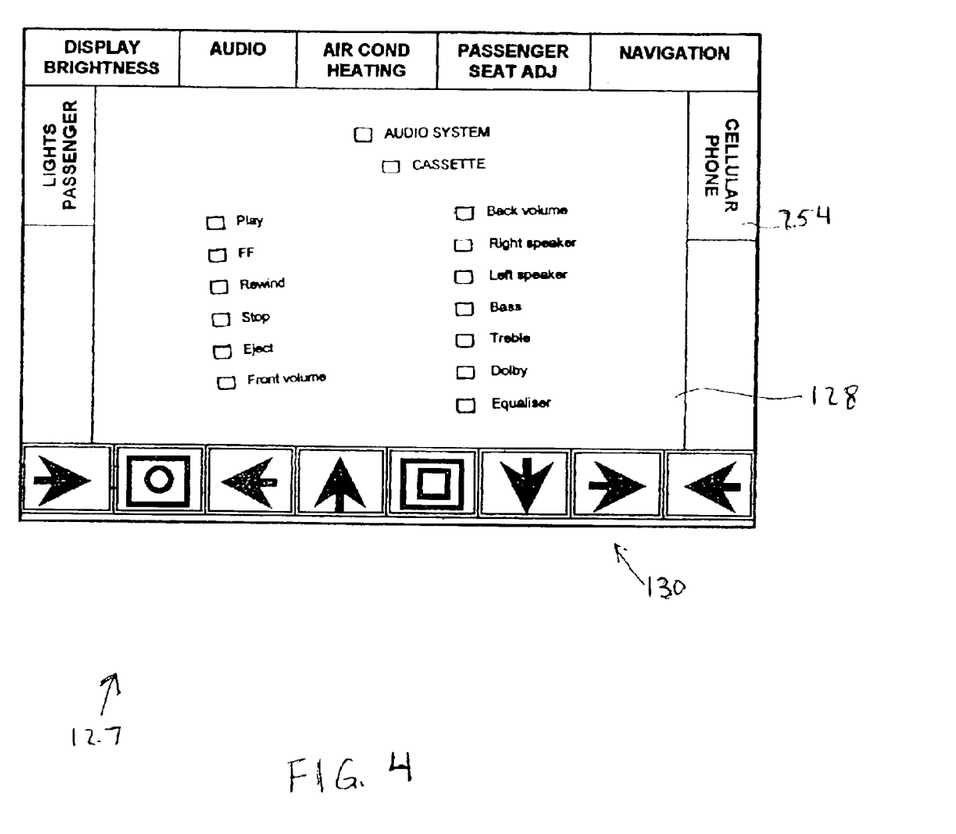
FIG. 4 depicts an illustrative secondary interface according to still another embodiment of the invention.

FIG. 4 depicts an illustrative secondary interface 127 according to still another embodiment of the invention. Secondary interface 127 includes a second display 128 and a set of input devices 130. Secondary display 128 operates in the same manner as selectable area 122 discussed with reference to FIG. 2. Similarly, set of input devices 130 includes various input devices that operate in the same manner as input devices 148A–C, 149A–E, discussed with reference to FIG. 3. However, a passenger operating secondary interface 127 can be limited to operate only a subset of the plurality of optional subsystems that can be operated by the driver. As a result, second display 128 can include a limited number of identifiers 254 that correspond to the subsystem(s) that passengers of the vehicle are allowed to operate. Similarly, both the driver and passenger can be limited to operating only a portion of an optional subsystem. For example, the driver can be allowed to adjust only the driver side seat, while the passenger is allowed to adjust only the passenger seat.

Figure 5:
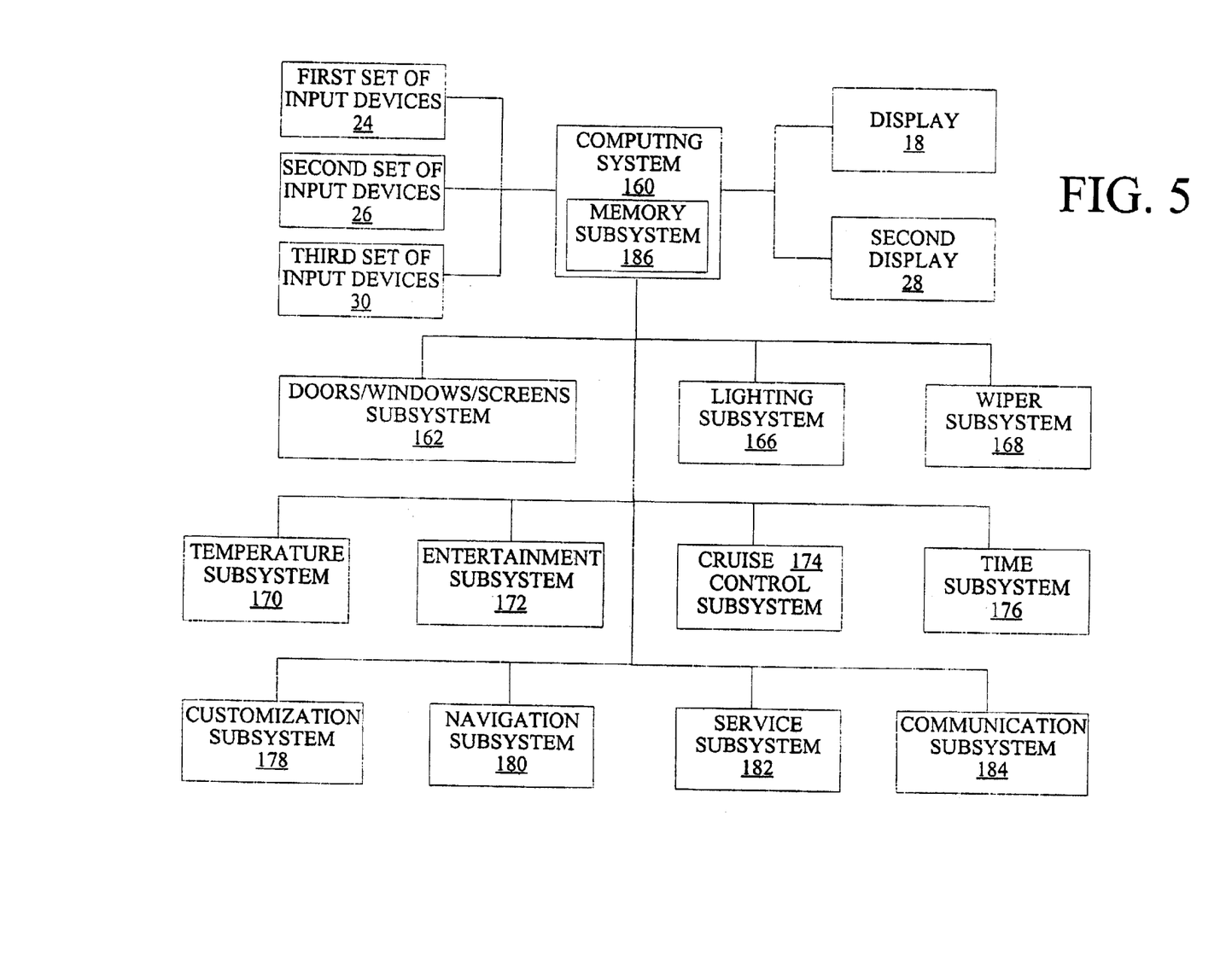
FIG. 5 depicts a schematic representation of illustrative systems and subsystems in a vehicle including one embodiment of the invention.

FIG. 5 depicts a schematic representation of communications between various systems and subsystems for vehicle 10 (FIG. 1). Computing system 160 is in communication with sets of input devices 24, 26, 30 and displays 18, 28. As discussed above, sets of input devices 24, 26, 30 are used by one or more users to adjust parameters for one or more of the plurality of subsystems in communication with computing system 160. Computing system 160 configures and/or operates the various subsystems depicted in response to input commands received from sets of input devices 24, 26, 30 and alters the content of displays 18, 28 accordingly. Each subsystem includes one or more parameters that can be adjusted by computing system 160. Based on the selected parameter settings, each subsystem alters its operation.

Several common optional subsystems that include one or more adjustable parameters are depicted. A user can use doors/windows/screens subsystem 162 to lock/unlock vehicle doors, enable/disable child safety locks, open/close various windows/screens in the vehicle, etc. Lighting subsystem 166 can turn on/off various interior lights, exterior lights, high beams, turn signals, hazard lights, adjust brightness, etc. Wiper subsystem 168 can be used to turn windshield, rear window, and/or headlight wipers on/off, and to adjust the speed and delay at which they operate. Each of these subsystems 162, 164, 166, 168 are commonly included in all vehicles and are generally operated using input devices located within the vehicle. It is understood that the user interface system of the invention can be used to supplement and/or replace some or all of these input devices.

Temperature subsystem 170 can be used to operate heating/cooling settings (i.e., turn vents and defrost on/off, adjust air intake, etc.), select a desired temperature for one or more zones within a vehicle, monitor an outdoor temperature, etc. Entertainment subsystem 172 can include an audio subsystem for operating a radio, tape player, CD player, etc., and/or an audio/visual subsystem for operating a television, VCR, DVD player, etc. Cruise control subsystem 174 can be used to set a desired constant speed and turn cruise control on/off. Time subsystem 176 can be used to set and display the time, date, etc. Customization subsystem 178 can be used to adjust the seat, mirrors, select a custom sound for a horn, etc. Navigation subsystem 180 can be used to map out directions, show current heading, plan a trip, etc. Service subsystem 182 can be used to inform the owner of scheduled maintenance (based on miles and/or date), keep a record of past maintenance, etc. Communication subsystem 184 can include a wireless telephone (i.e., cellular phone), an emergency communication device, an information device, etc.

It is understood that the various subsystems are presented for illustrative purposes only. As a result, one or more of the subsystems can be combined into a single subsystem, split into multiple subsystems, operated apart from the current invention, and/or can be excluded from a vehicle. Further, it is understood that the various subsystems can be implemented using any combination of hardware or software. As such, some or all of the various subsystems may be implemented on computing system 160. For example, memory subsystem 186 can be used to store and retrieve a default set of parameters for one or more drivers of vehicle 10 (FIG. 1). Consequently, a driver can be presented with a page that identifies various sets of parameters by, for example, an individual's name. Based on a selected set of parameters, computing system 160 can adjust parameters for one or more of the subsystems. For example, a desired temperature for temperature subsystem 170, seat and mirror location for customization subsystem 178, etc. can be adjusted. Further, it is understood that operation of the various subsystems may use one or more common output devices and/or may effect the operation of one or more other subsystems. For example, communication subsystem 184 can use speaker 37 (FIG. 1) that is also used by entertainment subsystem 172 to provide audio for one or more audio devices. Additionally, memory subsystem 186 and/or customization subsystem 178 can be used to select and change information displayed in fixed area 20 (FIG. 1). For example, a first driver may desire to view an indication of engine RPMs and a numeric display of vehicle speed, while a second driver may desire to view the current time, outdoor temperature, and an analog indication of vehicle speed. By selecting the appropriate set of parameters, fixed area 20 can be altered accordingly. In current vehicles, some or all of the parameters for the various subsystems are adjusted using various input devices commonly included on a steering column, driver door, passenger door, dashboard, etc. It is understood that input devices for these subsystems or any of the subsystems can be included apart from sets of input devices 24, 26, 30. Further, it is understood that any of the various subsystems can be operated independently from computing system 160. Communications between computing system 160, the various input/output devices, and the various subsystems can be implemented using any means now known or later developed.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A user interface system for a vehicle having a steering device, the system comprising:
    a plurality of pages, wherein each page includes at least one parameter for at least one of a plurality of optional subsystems for the vehicle;
    a display mounted behind the steering device, the display including a fixed area and a selectable area, wherein the fixed area displays vehicle information and the selectable area displays one of the plurality of pages, and wherein the fixed area and the selectable area each comprise a unique and static portion of the display; and
    a computing system in communication with the display device, wherein the computing system operates each of the plurality of optional subsystems based on the at least one parameter.

2. The user interface of claim 1, further comprising a first set of input devices in communication with the computing system, wherein the first set of input devices are mounted on the steering device.

3. The user interface of claim 2, further comprising a second set of input devices in communication with the computing system, wherein the first set of input devices select one of the plurality of pages to display in the selectable area, and wherein the second set of input devices adjust parameters in the page displayed in the selectable area.

4. The user interface of claim 3, wherein the first set of input devices and the second set of input devices are mounted on opposing sides of the steering device.

5. The user interface of claim 1, further comprising a secondary interface that includes a second display in communication with the computing system, wherein the second display selectively displays at least one of the plurality pages.

6. The user interface of claim 5, wherein the secondary interface further includes a third set of input devices in communication with the computing system and mounted on the second display, wherein the third set of input devices select one of the plurality of pages to display in the second display and adjust parameters on the page displayed in the second display.

7. A user interface system for a vehicle having a steering device, the system comprising:
   a plurality of pages, wherein each page includes at least one parameter for at least one of a plurality of optional subsystems for the vehicle;
   a display including a fixed area and a selectable area, wherein the fixed area displays vehicle information and the selectable area displays one of the plurality of pages, and wherein the fixed area and the selectable area each comprise a unique and static portion of the display;
   a first set of input devices that select one of the plurality of pages to display in the selectable area; and
   a second set of input devices that adjust the at least one parameter on the selected page;
   wherein the first set of input devices and the second set of input devices are mounted on opposing sides of the steering device.

8. The system of claim 7, further comprising a secondary interface that includes a third set of input devices.

9. The system of claim 8, wherein the secondary interface further includes a second display that displays one of the plurality of pages, and wherein the third set of input devices select one of the plurality of pages to display in the second display and adjust the at least one parameter on the page displayed in the second display.

10. The system of claim 7, further comprising a computing system in communication with the display, the first set of input devices, the second set of input devices, and the plurality of optional subsystems, wherein the computing system operates the display and the plurality of optional subsystems based on the input devices.

11. The system of claim 7, wherein the first set of input devices consists of three input devices and the second set of input devices consists of five input devices.

12. The system of claim 7, wherein the selectable display is mounted behind the steering device.

13. The system of claim 7, wherein the plurality of optional subsystems includes at least two of: a temperature subsystem, an entertainment subsystem, a customization subsystem, a cruise control subsystem, a navigation subsystem, a communications subsystem, a time subsystem, a service subsystem, and a memory subsystem.

14. The system of claim 7, wherein the plurality of optional subsystems includes at least one of: a doors/windows/screens subsystem, a lighting subsystem, and a wiper subsystem.

15. The system of claim 7, wherein the display further includes at least one warning area that displays a plurality of vehicle warning indicators.

16. A method of operating a plurality of optional subsystems for a vehicle having a steering device, the method comprising:
   displaying vehicle information in a fixed area of a display;
   displaying one of a plurality of pages in a selectable area of the display, wherein each page includes at least one parameter for at least one of the plurality of optional subsystems, and wherein the fixed area and the selectable area each comprise a unique and static portion of the display;
   selecting a page to display in the selectable area using a first set of input devices mounted on a first side of the steering device; and
   adjusting die at least one parameter on the selected page using a second set of input devices mounted on a second side of the steering device.

17. The method of claim 16, further comprising displaying one of the plurality of pages in a second display.

18. The method of claim 17, further comprising:
   selecting one of the plurality of pages to display in the second display using a third set of input devices mounted on the second display; and
   adjusting the at least one parameter on the selected page displayed in the second display using the third set of input devices mounted on the second display.

19. The method of claim 16, further comprising:
   displaying an identifier for each of the plurality of pages in the selectable area; and
   highlighting the identifier for the page being displayed.

20. The method of claim 16, further comprising generating an audible sound each time a mew page is selected fur display.

21. The user interface of claim 1, wherein an appearance of vehicle information in the fixed area can be modified by a user and wherein the modification cannot occur while the vehicle is being driven.

* * * * *

UNITED STATES PATENT AND TRADEMARK OFFICE
CERTIFICATE OF CORRECTION

PATENT NO. : 6,842,677 B2
DATED : January 11, 2005
INVENTOR(S) : Prakash S. Pathare It is certified that error appears in the above-identified patent and that said Letters Patent is hereby corrected as shown below:

Column 10,
Line 30, delete "die" and insert -- the --.
Line 48, delete "mew" and insert -- new --.
Line 48, delete "fur" and insert -- for --.

Signed and Sealed this

Tenth Day of May, 2005

JON W. DUDAS
*Director of the United States Patent and Trademark Office*